E. H. ALDEBORGH.
MECHANICAL MOVEMENT.
APPLICATION FILED NOV. 5, 1920.

1,387,825.

Patented Aug. 16, 1921.

INVENTOR

BY his ATTORNEYS

UNITED STATES PATENT OFFICE.

ERIK H. ALDEBORGH, OF POUGHKEEPSIE, NEW YORK, ASSIGNOR TO C. E. JOHANSSON, INC., OF POUGHKEEPSIE, NEW YORK, A CORPORATION OF DELAWARE.

MECHANICAL MOVEMENT.

1,387,825.

Specification of Letters Patent. Patented Aug. 16, 1921.

Application filed November 5, 1920. Serial No. 422,041.

*To all whom it may concern:*

Be it known that I, ERIK H. ALDEBORGH, a subject of the King of Sweden, and resident of Poughkeepsie, in the county of Dutchess and State of New York, have invented a new and useful Improvement in Mechanical Movements, of which the following is a specification.

The object of my invention is to provide certain improvements in the construction, form and arrangement of the several parts of a mechanical movement, whereby lost and inexact motion is eliminated in the conversion of a slight rectilinear motion into an extended circular motion.

A practical embodiment of the invention is represented in the accompanying drawings, in which, Figure 1 represents the movement in plan.

Figure 1:
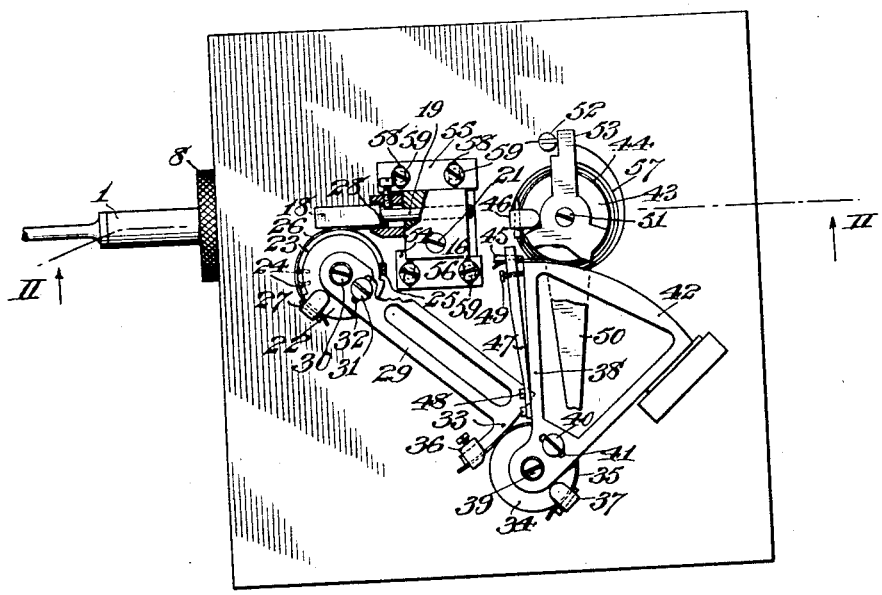
Figure 2:
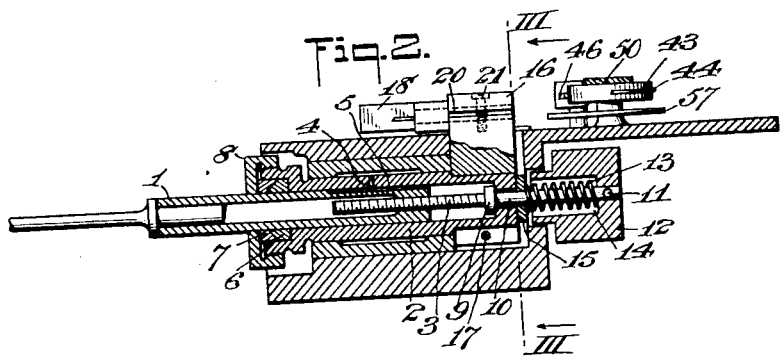
Fig. 2 represents a section taken in the plane of the line II—II of Fig. 1.
Figure 3:
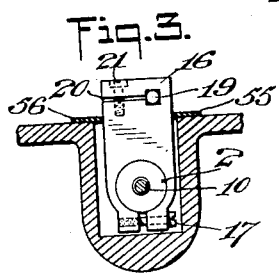
Fig. 3 represents a detail section taken in the plane of the line III—III of Fig. 2.

The movement comprises generally two mechanisms, viz: the mechanism which has a rectilinear reciprocating motion and the amplifying mechanism which has a circular motion.

The reciprocating member is herein shown as a tube 1 which is adjustable longitudinally in a sleeve 2 by means of an adjusting screw 3. This tube 1 is held from rotating in the sleeve 2 in which it is adjusted by a pin 4 and elongated groove 5.

The means for clamping the tube to and releasing it from the sleeve is herein shown as comprising a split cone ring 6 which coacts with a clamping ring 7 having a flaring recess for receiving the cone of the split ring, a thumb nut 8 which has a screw threaded engagement with the sleeve 2 serving to exert more or less endwise pressure on the clamping ring 7 and split ring 6 to lock and release the tube and sleeve.

The adjusting screw 3 is provided with a shoulder 9 which bears against the bottom of the recess in the sleeve 2, within which the tube 1 is located, and to the rear of this shoulder 9, the adjusting screw 3 is provided with a plain portion 10 which is pinned at 11 to a thumb nut 12. A spring 13 located in a recess 14 in the thumb nut surrounds the plain portion 10 of the adjusting screw and is interposed between a loose collar 15 and the bottom of said recess for holding the shoulder 9 of the adjusting screw snugly to its seat.

A split clamp 16 is mounted on the reduced rear end of the sleeve 2, a screw 17 being utilized for securing said clamp to the sleeve after the clamp has been adjusted accurately on the said sleeve. A pin is secured to the clamp in parallelism with the tube 1, which pin comprises a squared exposed end 18 and a round shank 19. This round shank is inserted into the clamp 16, said clamp being split at 20 and provided with a clamping screw 21 for securing the pin rigidly to the clamp after it has been adjusted to bring its plane surface into the proper position.

The first rocking member of the amplifying mechanism is denoted by 22 and it consists of a roller having a concentric surface on a segment 23, securely fastened at 24 to the roller 22, the free end of which segment is engaged by the tapered head of an adjusting screw 25 so that as the screw is turned in or out, the segment 23 will be expanded or contracted for slightly increasing or diminishing the diameter of the said concentric surface. This concentric surface of the roller 22 is located in close proximity to the plane surface of the rectilinearly reciprocating pin 18, 19, and a flexible connecting band 26 is located between the said pin and roller in extended engagement with both the plane and concentric surfaces. One end of this flexible band is secured to the periphery of the roller by the clamp 27, and the other end of the band is secured to the squared portion 18 of the pin by the clamp 28. This band may be adjusted lengthwise along either one or both of these members by means of the clamps 27 and 28 to change the relative positions of the two members.

An arm 29 projects from the axis 30 of the roller 22, which arm is rotatively adjustable with respect to the roller by means of a pin and slot connection 31, 32. The free end of this arm is provided with a concentric surface of greater diameter than the concentric surface of the roller 22, which concentric surface of greater diameter is formed on a segment 33 at the free end of the said arm.

A second rocking member comprises a roller 34 having its concentric surface coacting with the concentric surface of greater diameter of the rocking member 22. A flexible connecting band 35 is located between these two surfaces and in extended contact therewith, one end of the said band being secured to the concentric surface of greater diameter of the roller 22 by the clamp 36, and the other end of the said band being secured to the concentric surface of lesser diameter on the rocking member 34, by the clamp 37. This band may also be longitudinally adjusted by the manipulation of these clamps 36, 37.

An arm 38 projects from the axis 39 of the second rocking member or roller 34, which arm is rotatively adjusted with respect to the said roller by means of a pin and slot connection 40, 41, and it is provided with a concentric surface of greater diameter formed on a segment 42 at the free end of the said arm.

A third rocking member comprises a roller 43, the periphery of which forms a concentric surface of lesser diameter located in close proximity to the concentric suface of greater diameter on the rocking member or roller 34. A flexible connecting band 44 is located between these two adjacent concentric surfaces and in extended contact therewith, one end of which band is secured to the member 34 by the clamp 45, and the other end of which band is secured to the member 43 by the clamp 46, which clamp 45 in the present instance is carried by an arm 47, secured at 48 to the arm 38, and having an adjusting screw 49 for adjusting the arm 47 to adjust the flexible band 44 longitudinally.

An arm 50 is mounted on the axis 51 of the rocking member or roller 43 for transmitting the amplified converted slight rectilinear motion of the reciprocating member 1.

A stop 52 is arranged in position to limit the movement of the arm 50 in one direction by engaging an extension 53 of the said arm. A stop 54 is arranged in position to limit the outward movement of the reciprocating member 1 by engaging the split clamp 16, which stop is herein shown as forming a part of one of a pair of guide plates 55, 56 for guiding the clamp 16 in its longitudinal movement.

All of the parts are yieldingly held at the limit of their movement in one direction and the flexible connecting bands 26, 35, 44 are kept stretched at all times, in order to prevent any lost motion by providing a coil spring 57, one end of which is fastened to the member 43 and the other end of which is secured to the stud which forms the stop 52.

To bring the plane surface of the pin 18, 19 in close proximity to the concentric surface of the roller 22, the clamp 16 is rotatively adjustable on the axis of the reciprocating member 1 and the pin is rotatively adjustable in the clamp. Therefore, the pair of guide plates 55, 56 for the clamp may be made laterally adjustable by providing lateral elongated slots 58 for the set screws 59.

In use, the reciprocating member 1 is adjusted longitudinally to the desired point by first loosening the thumb nut 8 and then turning the thumb nut 12, and thereby the adjusting screw 3 to move the member 1 forwardly or backwardly to the desired point. The thumb nut 8 is then tightened, thereby locking the member 1 to the sleeve 2 which carries the clamp 16. The slight rectilinear movement of the member 1 and thereby the pin 18, 19 will be converted into an extended circular movement of the arm 50.

It will be understood that by expanding or contracting the segment 23 on the roller 22, the concentric surface of the said roller can be enlarged or ensmalled and in this way the working radius can be changed and the total ratio of the radii of the various rollers or roller sections can be controlled even if each individual radius should vary slightly from the normal size.

It will also be understood that by the adjustment, both of the clamp 16 and of the pin 18, 19, the plane surface of the portion 18 of the said pin can be brought into close proximity to the concentric surface of its adjacent roller and in parallelism therewith.

It will also be seen that in the motion converting and amplifying mechanism, the flexible connecting bands have an extended contact with the surfaces between which they pass, thus insuring absolute accuracy of the relative movement of the several parts.

What I claim is:—

1. Means for converting a slight rectilinear motion into an extended circular motion comprising reciprocating and rocking members having coacting surfaces, a flexible element connecting said members and extending along said coacting surfaces, and means for changing the diameter of the surface of the rocking member to change the throw of the rocking member.

2. Means for converting a slight rectilinear motion into an extended circular motion comprising reciprocating and rocking members having coacting surfaces, a flexible element connecting said members and extending along said coacting surfaces, means for adjusting the flexible element longitudinally to change the relative positions of said members, and means for changing the diameter of the surface of the rocking member to change the throw of the rocking member.

3. Means for converting a slight rectilinear motion into an extended circular motion comprising reciprocating and rocking members having coacting surfaces, and a flexible element connecting said members and extending along said coacting surfaces, adjusting means to change the relative positions of said members and the throw of said rocking member.

4. Means for converting a slight rectilinear motion into an extended circular motion comprising a reciprocating member having a plane surface, a plurality of rocking members having coacting concentric surfaces of different diameters, the first rocking member having a concentric surface arranged to coact with said plane surface, and flexible connections located between and extending along said coacting surfaces.

5. Means for converting a slight rectilinear motion into an extended circular motion comprising a reciprocating member having a plane surface, a plurality of rocking members, certain of the rocking members having two concentric faces of different diameters, the concentric face of greater diameter of one rocking member being arranged to coact with the concentric face of lesser diameter of another rocking member, the concentric face of lesser diameter of the first rocking member being arranged to coact with the plane surface of the reciprocating member, and flexible connecting elements located between and extending along said coacting surfaces.

6. Means for converting a slight rectilinear motion into an extended circular motion comprising a reciprocating member having a plane surface, a plurality of rocking members, certain of the rocking members having two concentric faces of different diameters, the concentric face of greater diameter of one rocking member being arranged to coact with the concentric face of lesser diameter of another rocking member, the concentric face of lesser diameter of the first rocking member being arranged to coact with the plane surface of the reciprocating member, flexible connecting elements located between and extending along said coacting surfaces, and means for yieldingly holding all of the members at the limit of their movement in one direction.

7. Means for converting a slight rectilinear motion into an extended circular motion comprising a reciprocating member having a plane surface, a rocking member having a concentric surface arranged to coact with said plane surface, a flexible connecting element located between and extending along said coacting surfaces, and means for adjusting the plane surface toward and away from the concentric surface.

8. Means for converting a slight rectilinear motion into an extended circular motion comprising a reciprocating member having a plane surface, a rocking member having a concentric surface arranged to coact with said plane surface, a flexible connecting element located between and extending along said coacting surfaces, means for adjusting the plane surface toward and away from the concentric surface and for squaring the plane surface with respect to said concentric surface.

9. Means for converting a slight rectilinear motion into a circular extended motion comprising reciprocating and rocking members having coacting surfaces, flexible elements connecting said members and located between and extending along said coacting surfaces, and means for adjusting the reciprocating member longitudinally.

10. Means for converting a slight rectilinear motion into an extended circular motion comprising reciprocating and rocking members having coacting plane and concentric surfaces, a flexible connecting element located between and extending along said surfaces, an arm carried by the said rocking member having a concentric surface of greater diameter, a second rocking member having a concentric surface of lesser diameter arranged to coact with the concentric surface of said arm, and a flexible connecting element located between and extending along said last named concentric surfaces.

11. Means for converting a slight rectilinear motion into an extended circular motion comprising reciprocating and rocking members having coacting plane and concentric surfaces, a flexible connecting element located between and extending along said surfaces, an arm carried by the said rocking member having a concentric surface of greater diameter, means for adjusting the arm rotatively, a second rocking member having a concentric surface of lesser diameter arranged to coact with the concentric surface of said arm, means for adjusting the arm rotatively, and a flexible connecting element located between and extending along said last named concentric surfaces.

12. Means for converting a slight rectilinear motion into an extended circular motion comprising reciprocating and rocking members having coacting plane and concentric surfaces, a flexible connecting element located between and extending along said surfaces, an arm carried by the said rocking member having a concentric surface of greater diameter, a second rocking member having a concentric surface of lesser diameter arranged to coact with the concentric surface of said arm, a flexible connecting element located between and extending along said last named concentric surfaces, an arm carried by the second named rocking member provided with a concentric surface of greater diameter, a third rocking member having a concentric surface of lesser diameter arranged to coact with the concentric surface of the last named arm, and a flexible connecting element located between and extending along said last named concentric surface engaging said last named concentric surface.

13. Means for converting a slight rectilinear motion into an extended circular motion comprising reciprocating and rocking members having coacting plane and concentric surfaces, a flexible connecting element located between and extending along said surfaces, an arm carried by the said rocking member having a concentric surface of greater diameter, a second rocking member having a concentric surface of lesser diameter arranged to coact with the concentric surface of said arm, a flexible connecting element located between and extending along said last named concentric surfaces, an arm carried by the second named rocking member provided with a concentric surface of greater diameter, a third rocking member having a concentric surface of lesser diameter arranged to coact with the concentric surface of the last named arm, a flexible connecting element located and extending along said last named concentric surfaces, and means for adjusting the end of one or more of the flexible connecting elements to change the relative positions of the rocking members.

14. Means for converting a slight rectilinear motion into an extended circular motion comprising reciprocating and rocking members having coacting plane and concentric surfaces, a flexible connecting element located between and extending along said surfaces, an arm carried by the said rocking member having a concentric surface of greater diameter, a second rocking member having a concentric surface of lesser diameter arranged to coact with the concentric surface of said arm, a flexible connecting element located between and extending along said last named concentric surfaces, an arm carried by the second named rocking member provided with a concentric surface of greater diameter, a third rocking member having a concentric surface of lesser diameter arranged to coact with the concentric surface of the last named arm, a flexible connecting element located between and extending along said last named concentric surfaces, and means for changing the diameter of the smaller concentric surface of the first rocking member to change the throw of all of the rocking members.

15. In combination, a suitable support, a sleeve having a limited rectilinear reciprocating movement therein, means yieldingly holding the sleeve at the limit of its movement in one direction, a member longitudinally adjustable in the sleeve, a clamp carried by the sleeve, a pin carried by the clamp, and motion converting and amplifying mechanism operated by said pin.

16. In combination, a suitable support, a sleeve having a limited rectilinear reciprocating movement therein, means yieldingly holding the sleeve at the limit of its movement in one direction, a member longitudinally adjustable in the sleeve, a clamp carried by the sleeve, a pin carried by the clamp, motion converting and amplifying mechanism operated by said pin, and means for rotatively adjusting the clamp and the pin.

17. In combination, a suitable support, a sleeve having a limited rectilinear reciprocating movement therein, means yieldingly holding the sleeve at the limit of its movement in one direction, a member carried by said sleeve, a clamp carried by the sleeve, a pin carried by the clamp, motion converting and amplifying mechanism operated by said pin, a member adjusting screw carried by the sleeve, and means for securing the member to and releasing it from the sleeve.

In testimony that I claim the foregoing as my invention, I have signed my name this 20th day of October, 1920.

ERIK H. ALDEBORGH.